United States Patent Office 2,870,211
Patented Jan. 20, 1959

2,870,211
PRODUCTION OF HALOFLUOROACETONE HYDRATE

Charles B. Miller and Cyril Woolf, Morristown, N. J., assignors to Allied Chemical Corporation, a corporation of New York No Drawing. Application December 15, 1954
Serial No. 475,568

3 Claims. (Cl. 260—593)

This invention is directed to perhalogenated fluoroacetone hydrates and to methods for making the same.

Objects of the invention are to provide symmetrical tetrafluorodichloroacetone hydrates such as $$CClF_2.CO.CClF_2.2\tfrac{1}{2}H_2O$$

and $CClF_2.CO.CClF_2.10H_2O$, and particularly a substantially pure, thermally stable $CClF_2.CO.CClF_2.2\tfrac{1}{2}H_2O$ in liquid form. From process aspects, the invention is directed to provision of reactions between symmetrical tetrafluorodichloroacetone and water to form the indicated hydrated compounds, and to provision of procedures for isolating such hydrates and recovering the same from the resulting reaction liquors. The new compounds of the invention are characterized by miscibility in all proportions with hydrophilic solvents, and are useful as promoters of mutual solubility of water and oils, e. g. in the making up of emulsions whereby emulsifying agent requirements are reduced, and in the making up of formulations comprising hydrophilic, hydrophobic and aqueous constituents.

In accordance with the invention, new products, i. e. $CClF_2.CO.CClF_2.2\tfrac{1}{2}H_2O$ and $CClF_2.CO.CClF_2.10H_2O$, have been discovered, and it has been found that by reacting sym-tetrafluorodichloroacetone and water under certain conditions it is possible to prepare either of the two hydrates—$CClF_2.CO.CClF_2.2\tfrac{1}{2}H_2O$ or $$CClF_2.CO.CClF_2.10H_2O$$

or mixtures of the same if desired. The invention also includes provision of procedures for separating these hydrates from excess water or ketone contained in the reaction mass in which the hydrates are formed.

In the practice of the invention, with regard to synthesis of the hydrates, the sole reactant components are sym-tetrafluorodichloroacetone and water. Symmetrical tetrafluorodichloroacetone at ordinary conditions is a substantially colorless liquid of the composition $$CClF_2.CO.CClF_2$$

and having a boiling point of about 44° C. This compound may be made for example by effecting reaction between anhydrous HF and hexachloroacetone at moderately elevated temperature while in the presence of antimony pentahalide and while maintaining the reaction mass substantially in the liquid phase, and thereafter recovering the $CClF_2.CO.CClF_2$ from the reaction products by suitable procedure such as distillation.

The following exemplifies manufacture of $$CClF_2.CO.CClF_2$$

1060 parts (weight) of hexachloroacetone and 571 parts of $SbCl_5$ were charged to a steel reactor connected with a fractionating column and reflux condenser cooled with ice water. The total of organic starting material and antimony pentahalide charged contained about 32 mol percent of the latter. HF was fed to the reactor initially maintained at 90° C. for 17 hours when the reaction temperature fell to 72° C. due to reflux of lower boiling perchlorofluoroacetone. Exit gas was partially condensed in a steel trap immersed in acetone-Dry Ice mixture and the residual HCl, 15.2 mols, was taken up in water. Reaction products were then distilled from the reactor until a pot temperature of 140° C. was reached. Product condensed in the acetone-Dry Ice trap was fractionally distilled to remove unreacted HF, and the still pot residue was combined with the main organic reaction products from the trap and the combined materials were then subjected to fractional distillation. 285 parts of $$CClF_2.CO.CClF_2$$

were recovered. Manufacture of $CClF_2.CO.CClF_2$ is discussed in greater detail in our copending application Serial No. 411,028, filed February 17, 1954, now abandoned, wherein this compound and processes for making the same are claimed.

Procedurally, practice of the present invention involves incorporation in any suitable manner of $CClF_2.CO.CClF_2$ and $H_2O$ as the sole reactants, the reaction mass throughout operation preferably consisting of $CClF_2.CO.CClF_2$ and $H_2O$ components only. The molecular proportions of water and $CClF_2.CO.CClF_2$ employed in any given operation are mostly dependent upon the particular product desired. It has been found that by incorporation of up to about 3 molecular proportions of water to one molecular proportion of $CClF_2.CO.CClF_2$ substantially all $CClF_2.CO.CClF_2$ which reacts produces $$CClF_2.CO.CClF_2.2\tfrac{1}{2}H_2O$$

In the case of use of a small amount of water, say one molecular proportion, some $CClF_2.CO.CClF_2.2\tfrac{1}{2}H_2O$ is formed, the balance of the $CClF_2.CO.CClF_2$ remaining unreacted. For best production of $$CClF_2.CO.CClF_2.2\tfrac{1}{2}H_2O$$

molecular proportions of water to ketone are in the range of about 2–3 to one. It has been found that when molecular proportions of water to $CClF_2.CO.CClF_2$ exceed about 3:1, some of the new compound $$CClF_2.CO.CClF_2.10H_2O$$

is formed. In the molecular proportion range of about 3 up to about 7 (inclusive) waters to one of $$CClF_2.CO.CClF_2$$

the resultant reaction mass contains mixtures of $$CClF_2.CO.CClF_2.2\tfrac{1}{2}H_2O$$

and $CClF_2.CO.CClF_2.10H_2O$, relative amounts of such products depending upon the mol proportions of water and $CClF_2.CO.CClF_2$. In the lower part of the 3 to 7 water to one $CClF_2.CO.CClF_2$ range, the presence of $CClF_2.CO.CClF_2.2\tfrac{1}{2}H_2O$ is dominant, while in the upper portion of such range the $CClF_2.CO.CClF_2.10H_2O$ is dominant.

When it is desired to make the $CClF_2CO.CClF_2.10H_2O$ product in the best manner and minimize the presence of $CClF_2.CO.CClF_2.2\tfrac{1}{2}H_2O$, it is preferred to use water substantially in the range of 8–13 mols per mol of $$CClF_2.CO.CClF_2$$

In the lower part of this range, the reaction liquor is substantially all the $CClF_2.CO.CClF_2.10H_2O$ product, while in the upper portion of such range, some water may remain unreacted.

As indicated above, at normal conditions $$CClF_2.CO.CClF_2$$

is a liquid boiling at 44° C. In accordance with the invention it has been found that $CClF_2.CO.CClF_2.2\tfrac{1}{2}H_2O$ has a boiling point of about 106° C. and a melting point of about minus 8° C., and that $CClF_2.CO.CClF_2.10H_2O$ has a melting point of about 24° C. At temperatures of say 40–50° C. and above, it appears that the $$CClF_2.CO.CClF_2.10H_2O$$

tends to lose some water of hydration accompanied by formation of substantially corresponding amounts of $CClF_2.CO.CClF_2.2\tfrac{1}{2}H_2O$. The reaction of $$CClF_2.CO.CClF_2$$

and water has been found to be moderately exothermic, sufficient heat being available to cause undesirable vaporization and loss of materials in the absence of satisfactory temperature control of the reaction mass. Incorporation of water and ketone may be effected by adding water to the ketone or vice versa, or by simultaneous addition of regulated quantities of reactants to each other in a suitable reaction vessel. Temperature control may be had by any suitable cooling of the reaction mass such as by regulation of rates of addition of constituents to each other, or by cooling of the reaction vessel such as by cooling coils or external cooling. If desired, the incorporation of water and ketone may be effected in a closed vessel provided with reflux facilities adequate to condense and return to the reacting mass any vapors which may be evolved therefrom.

From practical viewpoint, reaction is carried out preferably under temperature conditions such as to maintain the reacting ingredients and the resulting products in the liquid phase during reaction. Since the $$CClF_2.CO.CClF_2.2\tfrac{1}{2}H_2O$$

melts at about minus 8° C., assuming atmospheric pressure, reaction temperature may be rather low, down to say 5–10° C., upper preferred temperature being some practical value below the 44° C. boiling point of $CClF_2.CO.CClF_2$. In the manufacture of $$CClF_2.CO.CClF_2.10H_2O$$

or a product dominantly of this material, reaction temperature is preferably held at a minimum of some practical working value above 24° C., in order to keep the $CClF_2.CO.CClF_2.10H_2O$ produced in the liquid phase. As in the case of the $CClF_2.CO.CClF_2.2\tfrac{1}{2}H_2O$, for manufacture of $CClF_2.CO.CClF_2.10H_2O$ maximum reaction temperatures may be something appreciably less than 44° C. at atmospheric pressure, or the equivalent thereof if at another pressure. On completion of reaction of the selected quantities of water and $CClF_2.CO.CClF_2$ starting materials, the resultant reaction mass is a substantially colorless, water-like liquid.

The invention also comprises the discovery of methods for isolating either substantially pure $$CClF_2.CO.CClF_2.2\tfrac{1}{2}H_2O$$

or $CClF_2.CO.CClF_2.10H_2O$ or mixtures thereof from the water-$CClF_2.CO.CClF_2$ reaction mass depending upon whatever product may have been made. Such methods involve crystallization or distillation.

We find that either the $CClF_2.CO.CClF_2.2\tfrac{1}{2}H_2O$ or the $CClF_2.CO.CClF_2.10H_2O$ or mixtures thereof may be recovered from the above described reaction liquor by crystallization. In instances where substantially pure $$CClF_2.CO.CClF_2.2\tfrac{1}{2}H_2O$$

or $CClF_2.CO.CClF_2.10H_2O$ is desired, provided the already described preferred molecular proportions of water and $CClF_2.CO.CClF_2$ have been employed in making up the reaction liquor, either of the indicated products may be obtained in the form of crystals which are substantially pure. When recovering products by crystallization, procedure broadly involves cooling the particular reaction liquor at hand sufficiently to form solid crystals of the particular $CClF_2.CO.CClF_2$ hydrate involved, and then recovering the crystallized hydrate from residual mother liquor at a temperature low enough to maintain the hydrate in the solid condition.

To illustrate with regard to manufacture of substantially pure $CClF_2.CO.CClF_2.2\tfrac{1}{2}H_2O$ crystals, preferably 2–3 molecular proportions of water are reacted with one molecular proportion of $CClF_2.CO.CClF_2$ as above described, and the resulting liquor is then cooled by any suitable means to a practical working temperature value below minus 8° C. For instance, with temperatures reduced to about minus 12–15° C., the $$CClF_2.CO.CClF_2.2\tfrac{1}{2}H_2O$$

crystallizes out suddenly and cleanly from the mother liquor, the lower the temperature the greater the amount of product recovery as crystals. Separation of the crystals from mother liquor may be had, for example, by filtering by means of suitable conventional filtering apparatus equipped to maintain the crystals and the mother liquor at the desired low temperature during separation. The crystals thus recovered are substantially snow-white, and on analysis will be found to be $CClF_2.CO.CClF_2.2\tfrac{1}{2}H_2O$. Subsequent to the recovery of the product in the solid phase, if temperature is permitted to rise substantially above minus 8° C., the crystals liquefy and the product then exists as a stable liquid phase $$CClF_2.CO.CClF_2.2\tfrac{1}{2}H_2O$$

having a boiling point of about 106° C.

If it is desired to produce $CClF_2.CO.CClF_2.10H_2O$ in substantially pure solid form, water and $CClF_2.CO.CClF_2$, preferably in molecular proportions of about 8–13:1 are incorporated in the manner described, temperature during reaction being maintained not less than about 24° C. at atmospheric pressure. Thereafter, the reaction liquor is cooled to substantially below this value. Good crystallization may be had by cooling preferably to not below about 5° C., in order to prevent crystallization of any $CClF_2.CO.CClF_2.2\tfrac{1}{2}H_2O$ incidentally present. On cooling the reaction liquor to about 10° C., crystallization of $CClF_2.CO.CClF_2.10H_2O$, promoted by agitation or seeding if desired, takes place rapidly. Separation of the $$CClF_2.CO.CClF_2.10H_2O$$

crystals from the mother liquor is then effected under conditions such as to maintain crystals in the mother liquor within the range of say 5–20° C. The recovered crystals are substantially pure $CClF_2.CO.CClF_2.10H_2O$ having a melting point of 24° C. At room temperature and pressure these crystals are stable.

In accordance with another aspect of the invention, it has been found that $CClF_2.CO.CClF_2.2\tfrac{1}{2}H_2O$, in the form of a substantially pure thermally stable material which is liquid under ordinary conditions, may be recovered from a reaction or other liquor containing $CClF_2.CO.CClF_2$ and $H_2O$ components in any molecular proportions. This phase of the invention is predicated on the discovery that $CClF_2.CO.CClF_2.2\tfrac{1}{2}H_2O$ is a definite stable compound, is a distillable hydrate, and boils at about 106° C.

Procedurally, the instant modification of the invention comprises heating a liquor containing $$CClF_2.CO.CClF_2$$

and water components at temperature high enough and for a time interval sufficient to form a constant boiling liquid solution. More particularly, if there is no reason or desire to recover vaporized constituents, a liquor containing $CClF_2.CO.CClF_2$ and water components may be placed in an ordinary heating pot or vessel, and heated therein at temperature and for a time interval high enough to vaporize off all constituents boiling at temperatures below about 106° C. At this pot temperature the liquid remaining therein is thermally stable $$CClF_2.CO.CClF_2.2\tfrac{1}{2}H_2O$$

which remains in the liquid state at temperatures below about 106° C. and freezes at minus 8° C.

If the liquor for which the $CClF_2.CO.CClF_2.2\frac{1}{2}H_2O$ is to be recovered contains constituents of recoverable value such as an excess of $CClF_2.CO.CClF_2$, heating of the liquor containing $CClF_2.CO.CClF_2$ and water components may be effected in a still provided with a simple fractionating column. Assume availability of a crude liquor containing water and $CClF_2.CO.CClF_2$ components in proportion such that there is less $H_2O$ present than needed to form $CClF_2.CO.CClF_2.2\frac{1}{2}H_2O$, e. g. an $H_2O$ to $CClF_2.CO.CClF_2$ molecular ratio of about 1:1, that is, an excess of $CClF_2.CO.CClF_2$. On heating such a liquor, there is first obtained as overhead a fraction of material boiling in the range of about 44–47° C., the resulting condensate being substantially pure $$CClF_2.CO.CClF_2$$

and representing most of the excess $CClF_2.CO.CClF_2$ present in the liquor fed into the still. On continuing heating, an intermediate fraction boiling in the range of about 47–106° C. may be recovered as overhead from the fractionating still. At this point the liquor, remaining in the still as still bottoms, is a constant boiling solution boiling at about 106° C. The still bottoms may be permitted to cool, and thus constitute the liquid, thermally stable $CClF_2.CO.CClF_2.2\frac{1}{2}H_2O$ product of the invention. On the other hand, if a high degree purity product is desired, the liquid left in the still, after boiling off of constituents vaporizing at temperatures below about 106° C., may be further heated and completely vaporized, and the condensate obtained comprises a high purity $CClF_2.CO.CClF_2.2\frac{1}{2}H_2O$ liquid.

If the initially available crude liquor containing $CClF_2.CO.CClF_2$ and $H_2O$ components is so constituted as to contain a large excess of water over that needed to form the $CClF_2.CO.CClF_2.10H_2O$ product, procedure for recovery of the thermally stable $$CClF_2.CO.CClF_2.2\frac{1}{2}H_2O$$

material is substantially the same as above described. Thus, the crude liquor is run into a still and heated to vaporize off all materials vaporizing at temperature below about 106° C. In this situation, there is obtained a first fraction boiling at about 100° C., which fraction is substantially all water. Immediately following, there is obtained as overhead from the fractionating column an intermediate fraction boiling through the range of about 100–106° C. At this stage, the liquor in the still has become a constant boiling solution, boiling at about 106° C., and on cooling and analysis is found to be $CClF_2.CO.CClF_2.2\frac{1}{2}H_2O$. As before, the still bottoms may be considered as the $CClF_2.CO.CClF_2.2\frac{1}{2}H_2O$ product of the invention, or if greater purity is desired, all the still bottoms may be vaporized, and the vapors condensed to recover a substantially pure $$CClF_2.CO.CClF_2.2\frac{1}{2}H_2O$$

product.

It will be observed that, by the distillation operation described, the product recovered is always of $$CClF_2.CO.CClF_2.2\frac{1}{2}H_2O$$

Thus the distillation procedure facilitates recovery of the thermally stable $CClF_2.CO.CClF_2.2\frac{1}{2}H_2O$ from any liquor containing $CClF_2.CO.CClF_2$ and $H_2O$ components regardless of the molecular proportions of $$CClF_2.CO.CClF_2$$

and $H_2O$ of the liquor prior to distillation. While any crude liquor containing appreciable excess of $H_2O$ over that needed to form $CClF_2.CO.CClF_2.2\frac{1}{2}H_2O$ is constituted partly or largely of $CClF_2.CO.CClF_2.10H_2O$, it appears clear that during distillation any $$CClF_2.CO.CClF_2.10H_2O$$

present breaks down, water is removed therefrom and all of the $CClF_2.CO.CClF_2$ present is recovered as $CClF_2.CO.CClF_2.2\frac{1}{2}H_2O$. The herein discovery that the $CClF_2.CO.CClF_2.2\frac{1}{2}H_2O$ is a distillable hydrate affords the substantial advantage of providing relatively simple process for recovering $CClF_2.CO.CClF_2$, as the $$CClF_2.CO.CClF_2.2\frac{1}{2}H_2O$$

hydrate, from aqueous $CClF_2.CO.CClF_2$ solutions no matter how dilute.

The following exemplifies practice of the invention. Unless othewise indicated, parts stated are by weight.

*Example 1.*—40 parts of ice were gradually added to 200 parts of liquid $CClF_2.CO.CClF_2$ which was initially at temperature of about 20° C. Molecular proportions of water to sym-tetrafluorodichloroacetone were about 2.2:1. During addition of the ice and the resulting reaction, the reaction mass was cooled externally by an ice bath sufficiently to maintain the mass in the liquid phase, and maximum temperature of the resulting liquor did not exceed about 20° C. The reacted mass was then cooled down to about minus 15° C., at which temperature formation of crystals took place suddenly. The crystals were filteerd out of the substantially colorless, water-like mother liquor by means of a filter arranged to maintain temperature of the liquor close to minus 15° C. and below minus 8° C. There were recovered 150 parts of substantially snow-white crystals which analysis showed to be of the composition $$CClF_2.CO.CClF_2.2\frac{1}{2}H_2O$$

*Example 2.*—200 parts of liquid $CClF_2.CO.CClF_2$ were slowly added to 236 parts of water over a period of about 30 minutes. Molecular proportions of $H_2O$ to $CClF_2.CO.CClF_2$ were about 13:1. While the $CClF_2.CO.CClF_2$ and water were being incorporated, the reacting mass was at temperature above 24° C. and external ice bath cooling was such that maximum liquor temperature did not exceed about 35° C. The resulting clear, water-like liquid phase mass was cooled down to about 10° C. while agitating, and crystallization took place. The crystals were filtered out of the liquor by means of a cooled filter which maintained temperature of the liquor and crystals at about 10° C. 250 parts of substantially snow-white crystals having a composition of $CClF_2.CO.CClF_2.10H_2O$ were recovered.

*Example 3.*—About 142 parts of liquid $$CClF_2.CO.CClF_2$$

were slowly added to about 128 parts of water over a period of about 20 minutes. Molecular proportions of $H_2O$ to $CClF_2.CO.CClF_2$ were about 10:1. While the $CClF_2.CO.CClF_2$ and water were being incorporated the reacting mass was at temperature above 24° C. and cooling was such that maximum liquor temperature did not exceed about 35° C. The resulting liquid phase mass, comprising a solution consisting of about 52.6% (weight) $CClF_2.CO.CClF_2$ and about 47.4% water was transferred to a still provided with fractionation equipment. Following adequate heating in the boiler portion of the still, 85 parts of water were taken off from the top of the fractionating column as overhead. Immediately following, there were recovered as overhead from the fractionating column, 14 parts of an intermediate fraction boiling thru the range of 100–106° C. At this stage of distillation and temperature of operation, the liquor in the still had become a constant boiling solution, boiling at about 106° C. and was recovered as still bottoms. On cooling to about room temperature, it was found on analysis that the approximately 171 parts of liquid still bottoms consisted of substantially pure $$CClF_2.CO.CClF_2.2\frac{1}{2}H_2O$$

B. P. 106° C. and M. P. minus 8° C. It is noted in this run that although the liquor subjected to distillation contained sufficient water to form $CClF_2.CO.CClF_2.10H_2O$, such latter material, if present, was decomposed, and hydrate production and recovery was that of the thermally stable $CClF_2.CO.CClF_2.2\frac{1}{2}H_2O$.

*Example 4.*—About 20 parts of water were slowly added to about 200 parts of liquid $CClF_2.CO.CClF_2$ over a period of about 15 minutes. Molecular proportions of $H_2O$ to $CClF_2.CO.CClF_2$ were about 1.1:1. While the $CClF_2.CO.CClF_2$ and water were being incorporated the reacting mass was maintained in the liquid phase and cooling was such that maximum liquor temperature did not exceed about 40° C. The resulting liquid phase mass, comprising about 220 parts of a solution consisting of about 91% (weight) $CClF_2.CO.CClF_2$ and about 9% water was transferred to a still provided with fractionation equipment. On heating in the boiler portion of the still, there was taken off from the top of the fractionating column as overhead about 76 parts of $CClF_2.CO.CClF_2$ boiling at about 44–47° C. Immediately following there were recovered as overhead from the fractionating column, about 26 parts of an intermediate fraction boiling thru the range of 47–106° C. At this stage of distillation and temperature of operation, the liquor in the still had become a constant boiling solution, boiling at about 106° C. and was recovered as still bottoms. On cooling to about room temperature, it was found on analysis that the approximately 118 parts of liquid still bottoms was substantially pure $CClF_2.CO.CClF_2.2\frac{1}{2}H_2O$, B. P. 106° C. and M. P. minus 8° C. This operation exemplifies formation of $CClF_2.CO.CClF_2.2\frac{1}{2}H_2O$ in the presence of an excess of $CClF_2.CO.CClF_2$, and isolation of the $CClF_2.CO.CClF_2.2\frac{1}{2}H_2O$ therefrom.

We claim:

1. The process for obtaining $CClF_2.CO.CClF_2.2\frac{1}{2}H_2O$ from a liquor containing $CClF_2.CO.CClF_2$ and water constituents which comprises heating the liquor to distill therefrom volatile constituents which boil below about 106° C. at atmospheric pressure to form a liquid solution boiling constantly at about 106° C., and thereafter recovering $CClF_2.CO.CClF_2.2\frac{1}{2}H_2O$ of said heating operation.

2. The process for obtaining $CClF_2.CO.CClF_2.2\frac{1}{2}H_2O$ from a liquor containing $CClF_2.CO.CClF_2$ and water constituents which comprises heating said liquor to distill therefrom volatile constituents which boil below about 106° C. at atmospheric pressure to form a liquid solution boiling constantly at about 106° C., thereafter heating said solution to vaporize the same, condensing the resulting vapors, and recovering $CClF_2.CO.CClF_2.2\frac{1}{2}H_2O$.

3. The process which comprises forming a mixture containing $CClF_2.CO.CClF_2$ and water, said water being in molecular proportion substantially in the range of 2–3, maintaining the reaction mass at reactive temperature above about minus 8° C. and substantially in the liquid phase to produce $CClF_2.CO.CClF_2.2\frac{1}{2}H_2O$ hydrate, then cooling the resulting liquor sufficiently and below about minus 8° C. to form solid $CClF_2.CO.CClF_2.2\frac{1}{2}H_2O$ hydrate, and recovering said solid hydrate from said liquor at temperature low enough to maintain said hydrate in the solid form.

References Cited in the file of this patent

UNITED STATES PATENTS

| | | |
|---|---|---|
| 1,921,634 | Pasternack et al. | Aug. 8, 1933 |
| 2,017,980 | McQuaid | Oct. 22, 1935 |
| 2,549,609 | Johnson | Apr. 17, 1951 |
| 2,617,836 | Pearlson et al. | Nov. 11, 1952 |
| 2,715,144 | Ruh | Aug. 9, 1955 |

FOREIGN PATENTS

| | | |
|---|---|---|
| 495,516 | Canada | Aug. 25, 1953 |

OTHER REFERENCES

J. A. C. S. (McBee et al.), volume 74, 3902–04.

Grove et al.: Ind. and Eng. Chem., vol. 40, pp. 11–13 (1948).

Svanoe: J. Chem. Ed., October 1950, pp. 549–553.

Parkes: Mellor's Modern Inorganic Chemistry, pp. 291–3 (1951).